Patented Aug. 26, 1952

2,608,580

UNITED STATES PATENT OFFICE 2,608,580

N-ALKYL AMINOSALICYLAMIDES

Kai Arne Jensen, Copenhagen, Denmark, and Karl-Gustaf Rosdahl, Malmo, Sweden, assignors to Aktiebolaget Ferrosan, Malmo, Sweden No Drawing. Application March 18, 1949, Serial No. 82,292. In Sweden April 3, 1948

2 Claims. (Cl. 260—559)

The invention relates to the production of compounds of the type

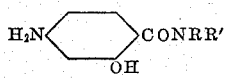

where R and R' signify hydrogen or alkyl. According to the invention such compounds may be produced by reacting the methyl ester of p-amino-salicylic acid with ammonia or aliphatic amines. This method is in a way surprising as the ethyl and higher esters do not react to give amides under similar conditions. Since the methyl ester of p-amino-salicylic acid may be produced in reasonably good yield by boiling the acid with methyl alcohol and sulfuric acid, amides of p-amino-salicylic acid may be produced in a technically favourable manner by the said reaction.

Compounds of this type are bacteriostatically active against tuberculosis bacteria.

Example I

A suspension of 20 grammes p-amino-salicylic acid-methyl ester in 100 mls. concentrated aqueous solution of ammonia is heated for 2 hours to 100° C. in a closed vessel. The surplus of ammonia is evaporated in vacuo and the precipitated crystals recrystallized from water. The resulting product is p-amino-salicylamide with M. P. 160° C.

Example II

A mixture of 10 grammes p-amino-salicylic acid-methyl ester and 10 grammes n-butyl amine is heated for 10 hours to 100° C. in a closed vessel. The surplus of n-butyl amine is removed by vapour distillation. From aqueous solution p-amino-salicylic acid-n-butylamide crystallises, which after recrystallization from water melts at 122° C.

We claim:

1. p-Amino-salicylamides of the general formula

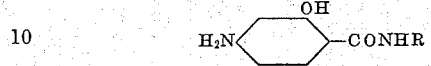

where R is an alkyl group, of not more than four carbon atoms.

2. p-Amino salicylic acid-n-butylamide.

KAI ARNE JENSEN.
KARL-GUSTAF ROSDAHL.

REFERENCES CITED

The following references are of record in the file of this patent:

UNITED STATES PATENTS

| Number | Name | Date |
|---|---|---|
| 2,463,462 | Huck | Mar. 1, 1949 |

FOREIGN PATENTS

| Number | Country | Date |
|---|---|---|
| 442,038 | Germany | Mar. 18, 1927 |

OTHER REFERENCES

Jacobs et al.: "J. Am. Chem. Soc.," vol. 39 (1917), p. 2420.

Jensen, Rosdahl and Ingvorsen: "Acta. Chem. Scand.," vol. 2 (1948), pp. 220–224. (Received February 21, 1948.)